United States Patent
Umetsu (10) Patent No.: US 6,628,519 B2
(45) Date of Patent: Sep. 30, 2003

(54) COMPUTER HAVING A FUNCTION FOR CONTROLLING TEMPERATURE OF FILE BAYS

(75) Inventor: Masakazu Umetsu, Yamagata (JP)

(73) Assignee: NEC Corporation, Tokyo (JP)

( * ) Notice: Subject to any disclaimer, the term of this patent is extended or adjusted under 35 U.S.C. 154(b) by 17 days.

(21) Appl. No.: 09/993,706

(22) Filed: Nov. 27, 2001

(65) Prior Publication Data

US 2002/0064025 A1 May 30, 2002

(30) Foreign Application Priority Data

Nov. 27, 2000 (JP) ........................................ 2000-360010

(51) Int. Cl.[7] ................................................ G06F 1/16
(52) U.S. Cl. ........................ 361/687; 361/688; 361/690
(58) Field of Search ................................ 361/685–695, 361/683; 713/300

(56) References Cited

U.S. PATENT DOCUMENTS

| | | | |
|---|---|---|---|
| 5,948,077 A | * | 9/1999 | Choi et al. ..................... 710/9 |
| 6,134,667 A | * | 10/2000 | Suzuki et al. ................ 713/300 |
| 6,142,866 A | * | 11/2000 | Wright ......................... 454/184 |
| 6,470,289 B1 | * | 10/2002 | Peters et al. ................. 702/132 |

FOREIGN PATENT DOCUMENTS

| | | | |
|---|---|---|---|
| JP | 10-91284 | | 4/1998 |
| WO | WO 00/22624 | * | 4/2000 |

* cited by examiner

*Primary Examiner*—Darren Schuberg
*Assistant Examiner*—Anthony Q. Edwards
(74) *Attorney, Agent, or Firm*—Young & Thompson (57) ABSTRACT

A computer that controls a temperature of its file bays includes a ventilation opening in a wall of the computer, a first file bay that contains a first file unit having its own ID, a second file bay that contains a second file unit having its own ID and that is arranged near the first file bay, a fan that dissipates heat from the first and second file units and that is arranged close to the ventilation opening, a bay identifying circuit that recognizes operation assuring temperatures of the first and second file units by referring to their IDs and that determines a blowing direction of the fan; and a fan control circuit that controls the blowing direction of the fan as determined by the bay identifying circuit.

20 Claims, 7 Drawing Sheets

BAY ID RELATIONSHIP TABLE

| BAY ID | DRIVE | OPERATION ASSURING TEMPERATURE |
|---|---|---|
| 1 [01] | FDD | 50 °C |
| 2 [10] | CD-ROM DRIVE | 55 °C |
| 3 [11] | HDD | 60 °C |

Fig. 3

| COMPARISON OF OPERATION ASSURING TEMPERATURE | BLOWING DIRECTION OF FAN 108 | AIR FLOW |
|---|---|---|
| FILE BAY 105 < FILE BAY 106<br><br>EXAMPLE:<br>FILE BAY 105 & FILE BAY 106<br>  FDD & CD-ROM DRIVE<br>  FDD & HDD<br>  CD-ROM DRIVE & HDD | A | VENTILATION OPENING 109 / FAN 108 → FILE BAY 105 → FILE BAY 106 → VENTILATION OPENING 110 |
| FILE BAY 105 > FILE BAY 106<br><br>EXAMPLE:<br>FILE BAY 105 & FILE BAY 106<br>  CD-ROM DRIVE & FDD<br>  HDD & FDD<br>  HDD & CD-ROM DRIVE | B | VENTILATION OPENING 109 / FAN 108 ← FILE BAY 105 ← FILE BAY 106 ← VENTILATION OPENING 110 |

PRIOR ART

Fig. 7

COMPUTER HAVING A FUNCTION FOR CONTROLLING TEMPERATURE OF FILE BAYS

BACKGROUND OF THE INVENTION

The present invention relates to a computer having a plurality of file bays in which a plurality of file units such as a hard disk drive and a CD-ROM drive can be selectively mounted and, more particularly, to the computer having a function for controlling the temperatures of the file bays.

A conventional computer having a function for controlling the temperature of a file bay provided in the computer will be explained in detail in reference to the drawings.

Figure 5:
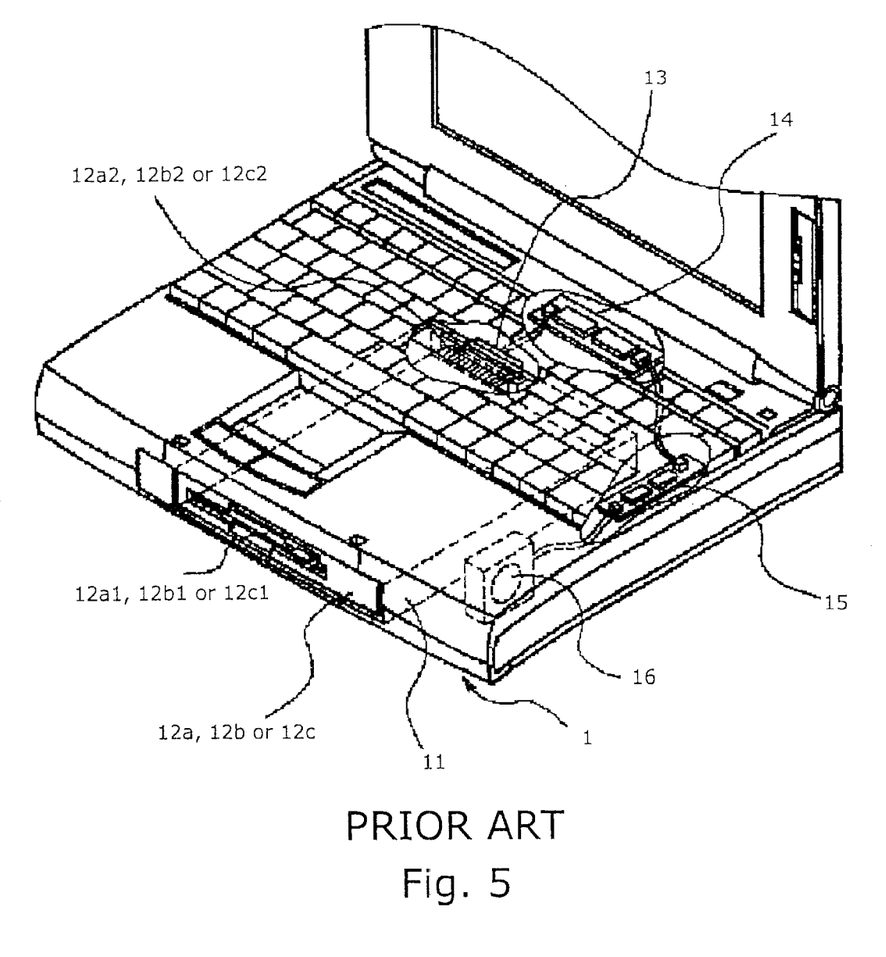
FIG. 5 is a perspective view showing one example of the prior art.
Figure 6:
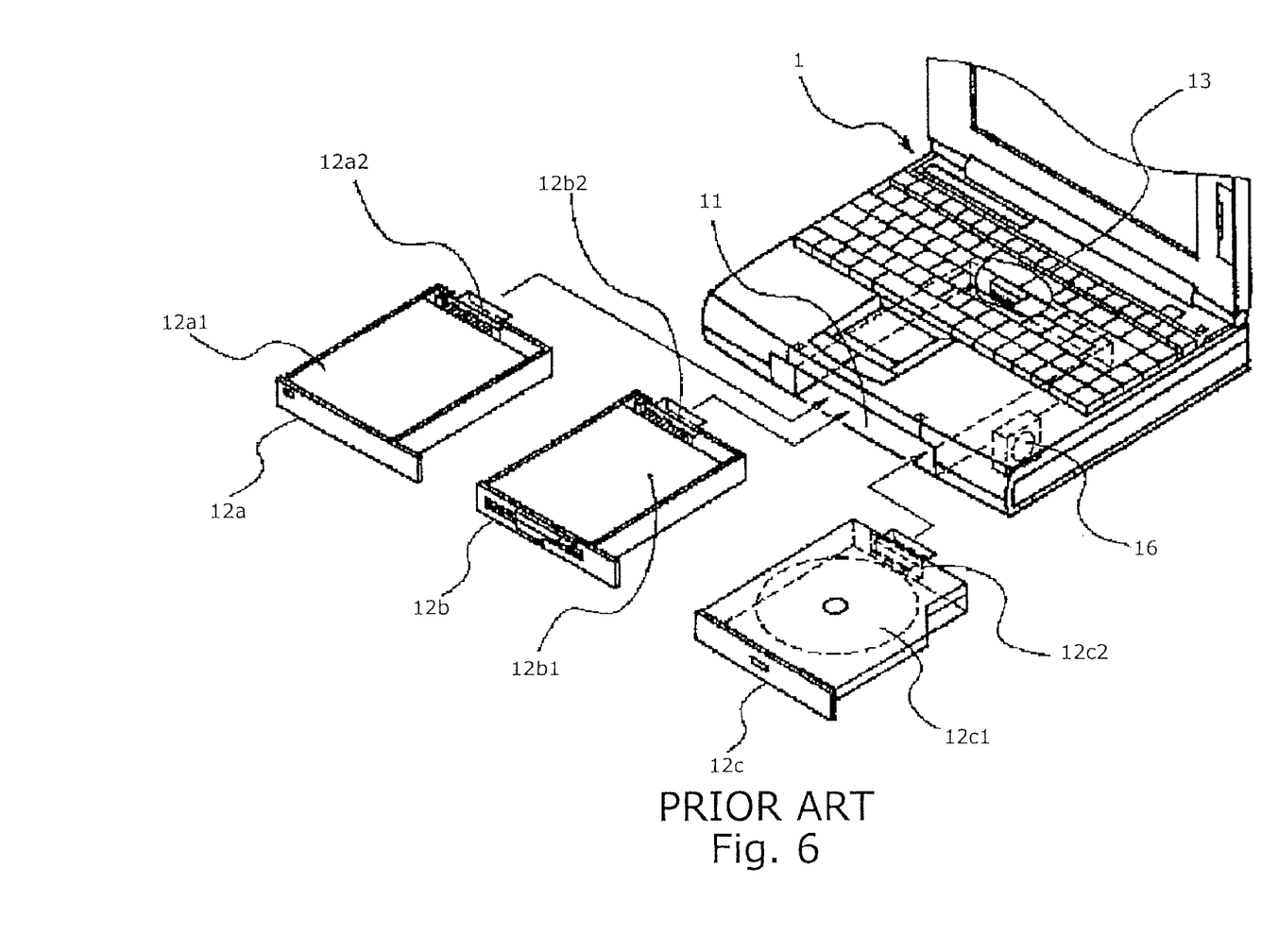
FIG. 6 is an exploded perspective view showing one example of the prior art.

Referring to FIG. 5 and FIG. 6, a portable computer 1 of the prior art includes: a space 11; any one of a case 12a to a case 12c detachably mounted in the space 11; a connector 13 in the main body of the portable computer 1; a determining circuit 14 for determining which one of the cases 12a to 12c is mounted; a control circuit 15 for controlling the rotation speed of a radiating fan 16 based on an output from the determining circuit 14; and the radiating fan 16.

The case 12a to the case 12c respectively include a file unit 12a1 to a file unit 12c1.

In this description, the file unit 12a1 is a hard disk drive (an HHD), the file unit 12b1 is a floppy disk drive (an FDD), and the file unit 12c1 is a CD-ROM drive. The number of signal pins of the file unit is different from each other.

Each case (12a to 12c) has a converting board (12a2 to 12c2) corresponding to the file unit (12a1 to 12c1), the file unit is connected to the converting board by the signal pins. Each of converting boards can connect to the connector 13. The connector 13 has signal pins adaptable to the file unit having the greatest number of signal pins and a signal pin for identifying a file unit.

Figure 7:
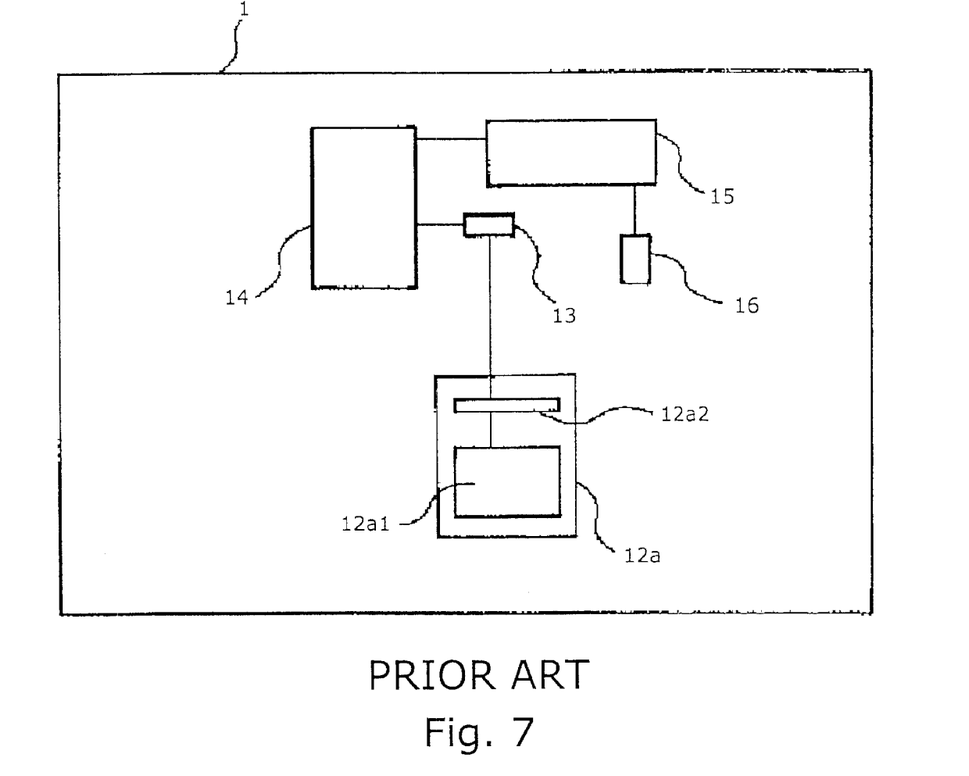
FIG. 7 is a block diagram illustrating the operation of the prior art.

Next, operation of the portable computer 1 will be described below in reference to FIG. 7.

First, one of the cases having the file unit selected by a user is mounted to the space 11. The determining circuit 14 identifies the file unit connected to the connector 13. Subsequently, the control circuit 15 determines the rotation speed of the radiating fan 16 based on heat generating quantities of the mounted file unit, thus actuating the radiating fan 16.

The function for controlling the temperature of a file bay according to the above-described conventional portable computer is for the computer having a single file unit.

SUMMARY OF THE INVENTION

The object of the present invention is to provide a computer having a function for controlling temperature of file bays optimally.

According to the present invention, a computer includes a ventilation opening in a wall of the computer, a first file bay that contains a first file unit having its own identification, a second file bay that contains a second file unit having its own identification and that is arranged near the first file bay, a fan that dissipates heat from the first and second file units and that is arranged close to the ventilation opening, a bay identifying circuit that recognizes operation assuring temperatures of the first and second file units by referring to their identifications and determines a blowing direction of the fan; and a fan control circuit that controls the blowing direction of the fan as determined by the bay identifying circuit.

BRIEF DESCRIPTION OF THE DRAWINGS

These and other objects, features and advantages of the invention will become more apparent from the following detailed description when taken in conjunction with the accompanying drawings, in which.

DESCRIPTION OF THE PREFERRED EMBODIMENTS

Next, the present invention will be explained in detail below in reference to the accompanying drawings.

Figure 1:
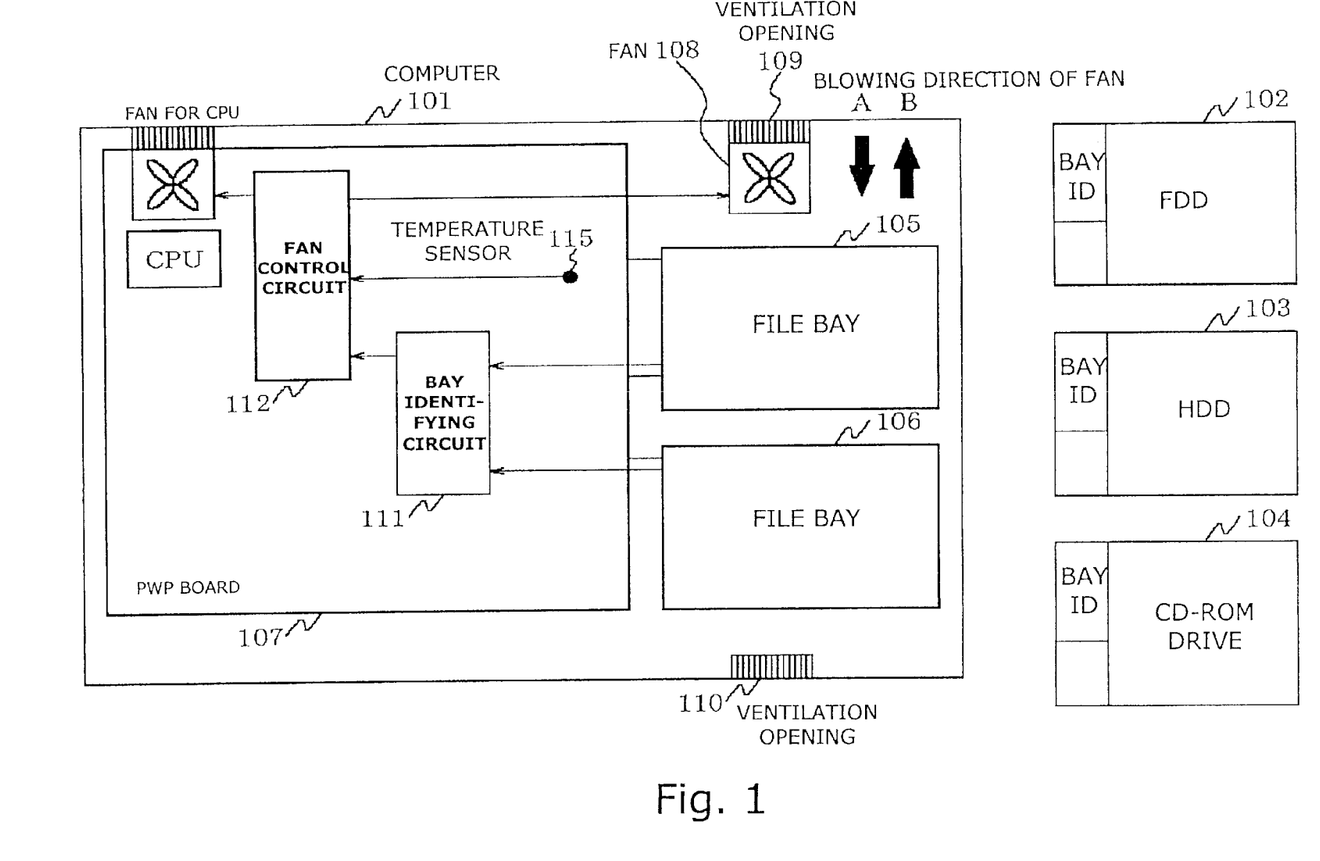
FIG. 1 is a block diagram illustrating one preferred embodiment according to the present invention.

Referring to FIG. 1, a computer 101, for example a notebook computer, includes a file bay 105, a file bay 106, a ventilation opening 109, a ventilation opening 110, a bay fan 108, a temperature sensor 115, a bay identifying circuit 111, and a fan control circuit 112.

Each of the file bays (105 and 106) can contain one of file units (102 to 104) therein, selectively.

The ventilation opening 109 is formed on a first side wall of the computer 101. The ventilation opening 110 is formed on a second side wall of the computer 101 opposite the first side wall.

The bay fan 108 is placed close to the ventilation opening 109.

The temperature sensor 115 detects an ambient temperature of the file bays, and transmits information of the temperature to the fan control circuit 112.

The bay identifying circuit 111 identifies which bay units (102 to 104) are mounted to the file bays (105 and 106) by a bay ID signal transmitted from the mounted file unit, determines a blowing direction of the fan 108, and transmits a blowing direction indicating signal to the fan control circuit 112.

The fan control circuit 112 transmits a fan control signal to the bay fan in order to control the direction and speed of rotation of the bay fan 108, based on the blowing direction indicating signal and the information of the ambient temperature of the file bays.

In this embodiment, the file unit 102 is an FDD, the file unit 103 is an HDD 103, and the file unit 104 is a CD-ROM drive. Each of the file units (102 to 104) has a bay ID, which indicates its own type of file unit.

Further, each of the file units has its own operation assuring temperature. The operation assuring temperatures of the drives are generally set to 50° C. for the FDD, 60° C. for the HDD and 55° C. for the CD-ROM drive, respectively. That is, the operation assuring temperature depends on the type of the drive. Then, the rotating direction, namely inhalation or exhaust, of the bay fan 108 is changed, according to the file units mounted in the file bays, as explained below.

Therefore, in the case where the file unit having a low operation assuring temperature is mounted in the file bay 105 while the file unit having a high operation assuring temperature is mounted in the file bay 106, the bay fan 108 is rotated forward, so that outside air is taken in through the ventilation opening 109, and then, heated air is dissipated through the ventilation opening 110. In sum, in this case, a blowing direction of fan 108 is "A" in FIG. 1.

In contrast, in the case where the file unit having a high operation assuring temperature is mounted in the file bay 105 while the file unit having a low operation assuring temperature is mounted in the file bay 106, the bay fan 108 is reversely rotated, so that the outside air is taken in through the ventilation opening 110, and then, the heated air is dissipated through the ventilation opening 109. In sum, in this case, a blowing direction of fan 108 is "B" in FIG. 1.

In other words, in the case where the operation assuring temperature of the drive in the file bay 105 is lower than that in the file bay 106, the optimum means for preventing any increase in temperature of the file bays is to control the fan 108 in the blowing direction "A" in FIG. 1, in which the file bay 105 is remarkably cooled.

In contrast, in the case where the operation assuring temperature of the drive in the file bay 105 is higher than that in the file bay 106, the optimum means for preventing any increase in temperature of the file bays is to control the fan in the blowing direction "B" in FIG. 1, in which the file bay 106 is remarkably cooled.

Figure 2:
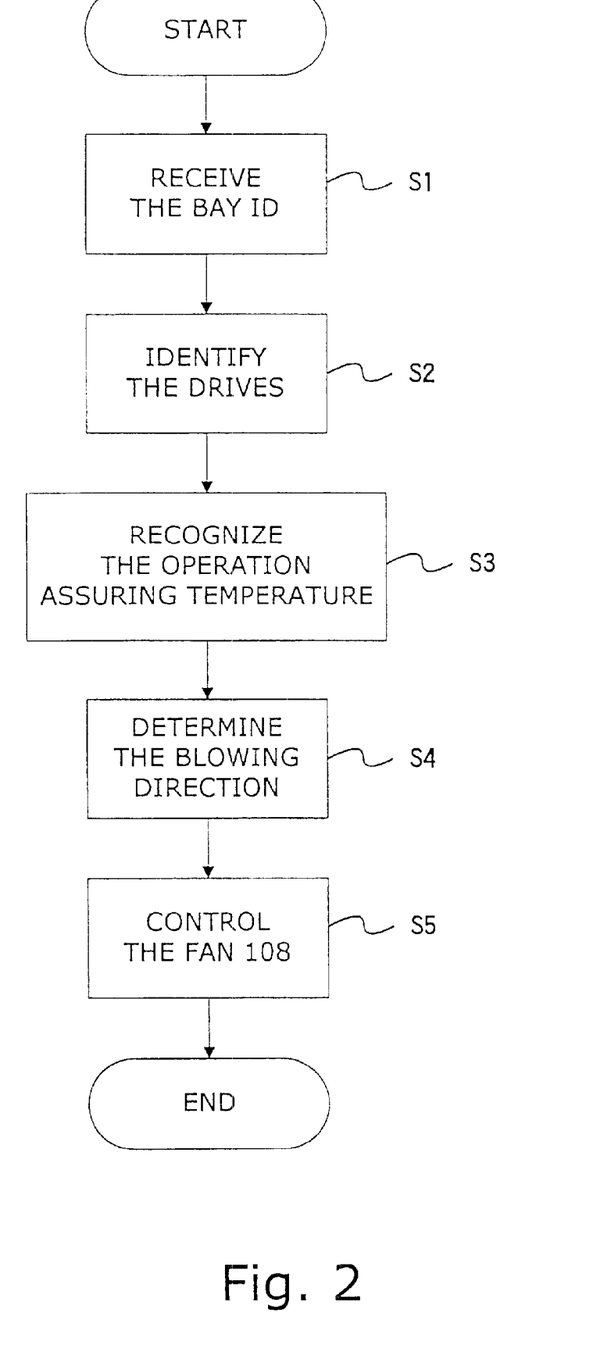
FIG. 2 is a flowchart for explaining the processing of the computer 101 according to the embodiment of the present invention.

Next, referring to FIG. 2, explanation will be made on a case in which the FDD 102 is mounted in the file bay 105 and the HDD 103 is mounted in the file bay 106.

Figure 3:
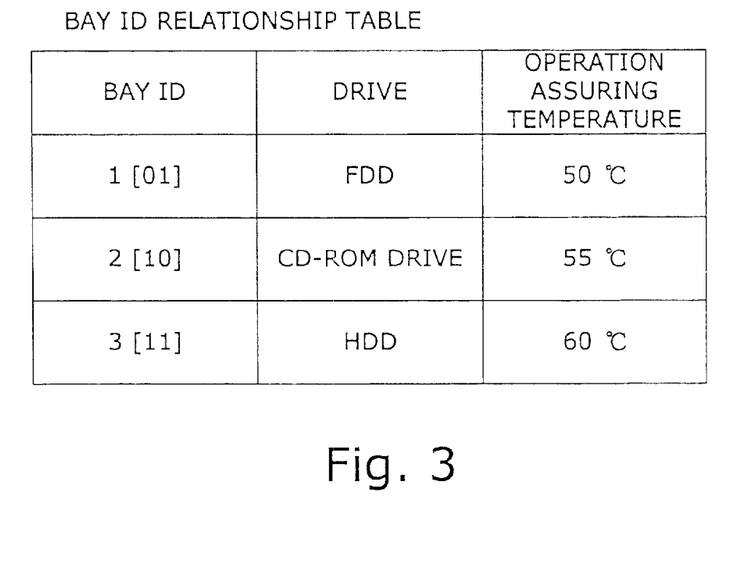
FIG. 3 is an example of a bay ID relationship table.

First, the bay identifying circuit 111 receives the bay ID of the mounted drives (Step S1), identifies which drive is mounted in the file bay 105 and 106, respectively (Step S2), and recognizes the respective operation assuring temperatures of the FDD 102 and the HDD 103 by referring to a bay ID relationship table illustrated in FIG. 3 (Step S3).

The bay ID relationship table is stored in the bay identifying circuit 111 or a memory in the computer 101, and relates the operation assuring temperature with the bay ID. However, information of the operation assuring temperature may be included in the bay ID, instead of storing the relationship table in the computer 101.

Then, the bay identifying circuit 111 determines the blowing direction of the fan 108 and transmits information of the blowing direction to the fan control circuit 112 (Step S4). In detail, the bay identifying circuit 111 compares the operation assuring temperature of the FDD 102 with that of the HDD 103, detects the temperature of the FDD is smaller than that of HDD 103, and determines that the blowing direction of the fan 108 is the direction "A".

Then, when the fan control circuit 112 detects the ambient temperature of the file bays being close or equal to 50° C., which is the lower operation assuring temperature, from the temperature sensor 115, the circuits 112 sets the fan power of fan 108 for ON-state and the blowing direction of the fan 108 for the direction "A" based on the information of the blowing direction transmitted from the bay identifying circuit 111 (Step S5). Then, the fan control circuit 112 controls rotating speed of the fan 108 in response to change of the ambient temperature of the file bays detected by the temperature sensor 115.

In this way, the fan control circuit 112 efficiently controls the bay fan 108 by required minimum operation.

Figure 4:
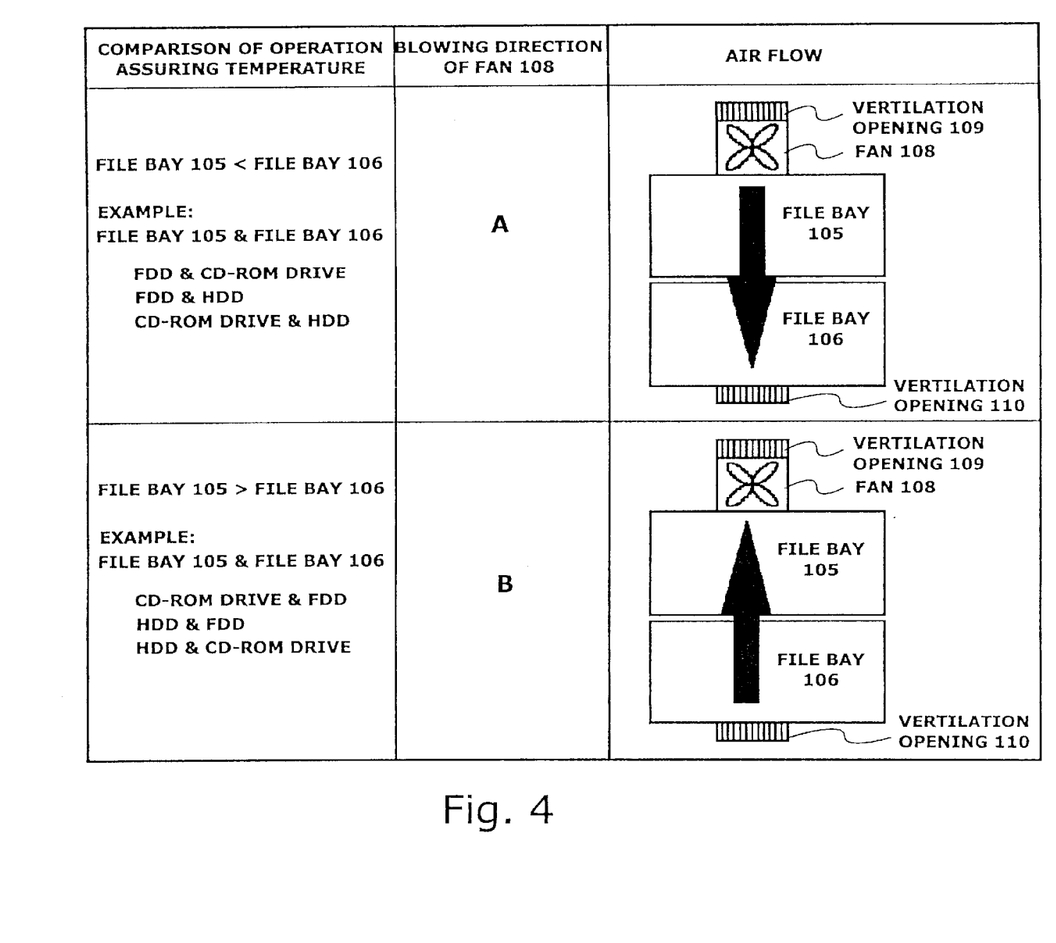
FIG. 4 is a table illustrating the correspondence of fan blowing direction control.

As the air flow in the blowing direction "A" is illustrated in FIG. 4, the outside air having a temperature lower than that inside of the computer 101 enters through the ventilation opening 109, passes the file bay 105, and then, the air having a higher temperature, staying inside, gets out of the ventilation opening 110 through the file bay 106, thereby remarkably cooling the drive of the file bay 105.

In this manner, it is possible to effectively cool the drive of the file bay 105 having a lower operation assuring temperature.

As shown in FIG. 4, the same temperature and fan control as described above is performed in the case in which the FDD 102 is mounted in the file bay 105 and the CD-ROM drive 104 is mounted in the file bay 106, and further, in the case in which the CD-ROM drive 104 is mounted in the file bay 105 and the HDD 103 is mounted in the file bay 106 except that the lower operation assuring temperature is 55° C.

Next, Explanation will be made on a case in which the HDD 103 is mounted in the file bay 105 and the FDD 102 is mounted in the file bay 106. In this case, the blowing direction of the fan 108 is the direction "B", after the processing shown in FIG. 2.

As the air flow in the blowing direction "B" is illustrated in FIG. 3, the outside air having a temperature lower than that inside of the system enters through the ventilation opening 110, passes the file bay 106, and then, the air having a higher temperature, staying inside, gets out of the ventilation opening 109 through the file bay 105, thereby remarkably cooling the drive of the file bay 106.

In this manner, it is possible to effectively cool the drive of the file bay 106 having a lower operation assuring temperature.

The similar temperature and fan control as described above is performed in the case in which the CD-ROM drive 104 is mounted in the file bay 105 and the FDD 102 is mounted in the file bay 106, and further, in the case in which the HDD 103 is mounted in the file bay 105 and the CD-ROM drive 104 is mounted in the file bay 106.

In above-described embodiment, the ventilation opening 110 is arranged at the just opposite side of the ventilation opening 109. However, the ventilation opening 110 can arrange at anywhere or is not necessary, in the condition that an air flow for dissipating the heat of the file units 105 and 106 is assured.

According to the present invention, in the case where the drives having the different operation assuring temperatures are mounted in the two file bays, the computer recognizes the operation assuring temperatures of the drives, changes the blowing direction of the fan according to the arrangement or configuration of the file bays mounted thereon, and thus controls the temperatures of the file bays optimally.

As described above, the temperature and fan can be efficiently controlled in the computer, to which the present invention is applied, thereby preventing any increase in temperature inside of the computer, to thus enhance the reliability of the computer with respect to heat.

While this invention has been described in conjunction with the preferred embodiment described above, it will now be possible for those skilled in the art to put this invention into practice in various other manners.

What is claimed is:

1. A computer comprising:
   a ventilation opening in a wall of said computer;
   a first file bay which contains a first file unit having a first identification;
   a second file bay which contains a second file unit having a second identification and that is arranged near said first file bay;

a fan which dissipates heat of said first and second file units and is arranged close to said ventilation opening;

a bay identifying circuit which recognizes operation assuring temperatures of said first and second file units by referring to said first and second identifications and that determines a blowing direction of said fan based on the operation assuring temperatures; and a fan control circuit which controls the blowing direction of said fan as determined by said bay identifying circuit.

2. The computer claimed in claim 1:

wherein said first bay is nearer said ventilation opening than said second file bay; and wherein said bay identifying circuit compares said operation assuring temperatures of said first and second file units, and said bay identifying circuit determines said blowing direction as blowing from said ventilation opening to said second file bay through said first file bay, if said operation assuring temperature of said first file unit is lower than that of said second file unit.

3. The computer claimed in claim 2, wherein said bay identifying circuit determines said blowing direction as blowing from said second file bay to said ventilation opening through said first file bay, if said operation assuring temperature of said first file unit is higher than that of said second file unit.

4. The computer claimed in claim 1, wherein said computer stores an identification relationship table that indicates relationships between said first and second identifications and said operation assuring temperatures, respectively, and wherein said bay identifying circuit refers to said table to determine said operation assuring temperatures.

5. The computer claimed in claim 1, wherein said first and second identifications each include a respective one of said operation assuring temperatures.

6. The computer claimed in claim 1 further comprising:

a temperature sensor that detects an ambient temperature of said first and second file bays, wherein said fan control circuit controls rotation speed of said fan based on said ambient temperature.

7. The computer claimed in claim 6, wherein when said ambient temperature is close or equal to a lower one of the operation assuring temperatures, said fan control circuit turns said fan ON.

8. A computer comprising:

a ventilation opening in a wall of said computer;

a first file bay which contains a first file unit having a first identification;

a second file bay which contains a second file unit having a second identification and that is arranged near said first file bay;

a fan which dissipates heat of said first and second file units and is arranged close to said ventilation opening;

a bay identifying circuit which recognizes operation assuring temperatures of said first and second file units by referring to said first and second identifications and that determines a blowing direction of said fan based on the operation assuring temperatures; and a fan control circuit which controls the blowing direction of said fan determined by said bay identifying circuit;

wherein said first file bay is sandwiched between said ventilation opening and said second file bay.

9. The computer claimed in claim 8, wherein said bay identifying circuit compares said operation assuring temperatures of said first and second file units, and said bay identifying circuit determines said blowing direction as blowing from said ventilation opening to said second file bay through said first file bay, if said operation assuring temperature of said first file unit is lower than that of said second file unit.

10. The computer claimed in claim 9, wherein said bay identifying circuit determines said blowing direction as blowing from said second file bay to said ventilation opening through said first file bay, if said operation assuring temperature of said first file unit is higher than that of said second file unit.

11. The computer claimed in claim 8, wherein said computer stores an identification relationship table that indicates relationships between said first and second identifications and said operation assuring temperatures, respectively, and wherein said bay identifying circuit refers to said table to determine said operation assuring temperatures.

12. The computer claimed in claim 8, wherein said first and second identifications each include a respective one of said operation assuring temperatures.

13. The computer claimed in claim 8 further comprising:

a temperature sensor that detects an ambient temperature of said first and second file bays, wherein said fan control circuit controls rotation speed of said fan based on said ambient temperature.

14. The computer claimed in claim 13, wherein when said ambient temperature is close or equal to a lower one of the operation assuring temperatures, said fan control circuit turns said fan ON.

15. A computer comprising:

a first ventilation opening in a first side wall of said computer;

a second ventilation opening in a second side wall of said computer opposite said first side wall;

a first file bay which contains a first file unit having a first identification;

a second file bay which contains a second file unit having a second identification and that is arranged near said first file bay;

a fan which dissipates heat of said first and second file units and is arranged close to said first ventilation opening;

a bay identifying circuit which recognizes operation assuring temperatures of said first and second file units by referring to said first and second identifications and that determines a blowing direction of said fan based on the operation assuring temperatures; and a fan control circuit which controls the blowing direction of said fan determined by said bay identifying circuit;

wherein said first and second file bays are sandwiched between said first and second ventilation openings.

16. The computer claimed in claim 15, wherein said bay identifying circuit compares said operation assuring temperatures of said first and second file units, and said bay identifying circuit determines said blowing direction as blowing from said first ventilation opening to said second ventilation opening through said first file bay and said second file bay, if said operation assuring temperature of said first file unit is lower than that of said second file unit.

17. The computer claimed in claim 16, wherein said bay identifying circuit determines said blowing direction as blowing from said second ventilation opening to said first ventilation-opening through said second file bay and first file bay, if said operation assuring temperature of said first file unit is higher than that of said second file unit.

18. The computer claimed in claim 15, wherein said computer stores an identification relationship table that indicates relationships between said first and second identifications and said operation assuring temperatures, respectively, and wherein said bay identifying circuit refers to said table to determine said operation assuring temperatures.

19. The computer claimed in claim 15, wherein said first and second identifications each include a respective one of said operation assuring temperatures.

20. The computer claimed in claim 15 further comprising:
a temperature sensor that detects an ambient temperature of said first and second file bays,
wherein said fan control circuit controls rotation speed of said fan based on said ambient temperature.

* * * * *